Figure 1:
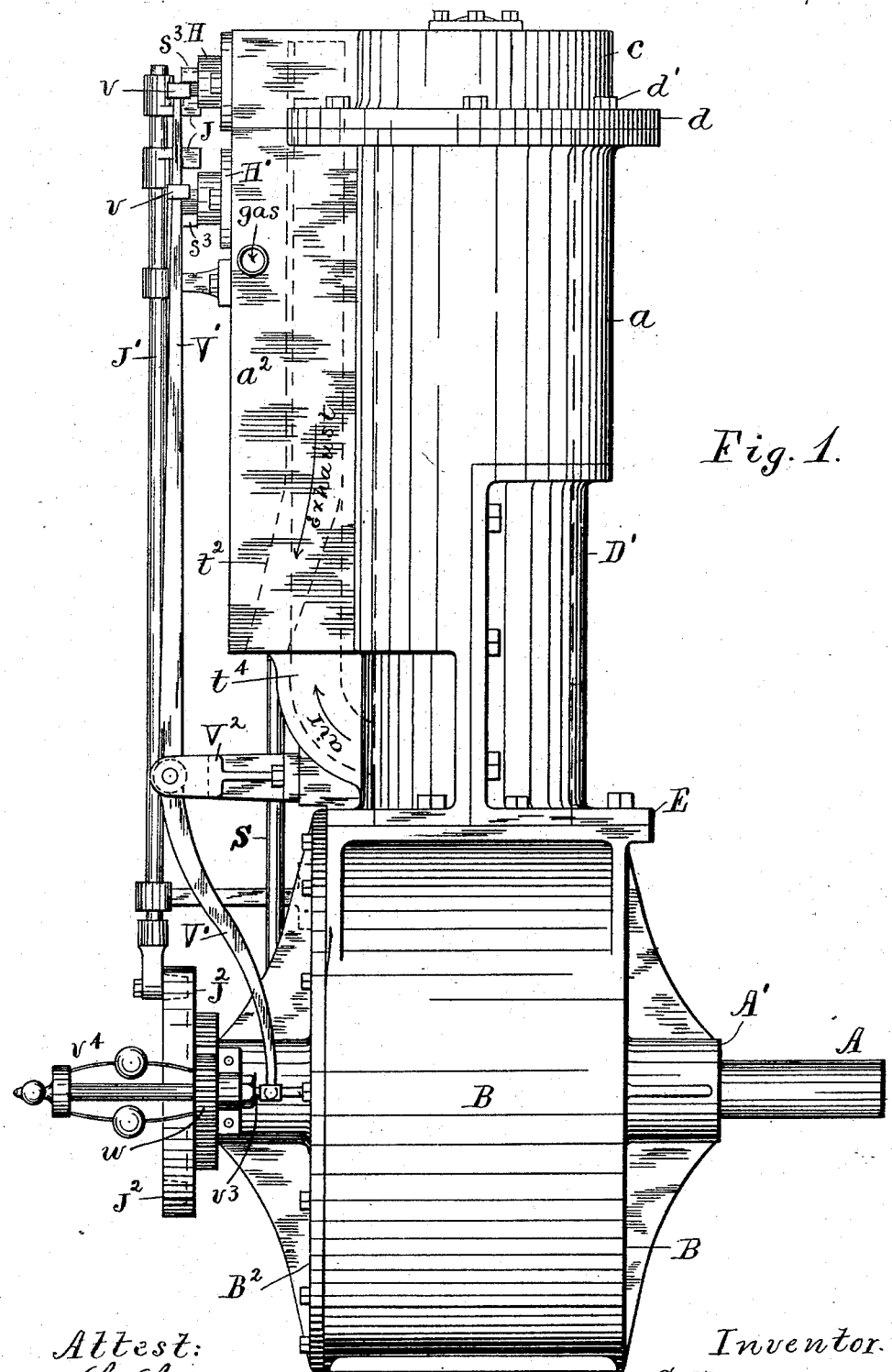

(No Model.) 5 Sheets—Sheet 1.

C. B. WATTLES.
GAS MOTOR ENGINE.

No. 509,981. Patented Dec. 5, 1893.

Attest:
L. Lee.
Edw. F. Kinsey.

Inventor.
C. B. Wattles,
per Crane & Miller, Attys.

(No Model.) 5 Sheets—Sheet 2.

C. B. WATTLES.
GAS MOTOR ENGINE.

No. 509,981. Patented Dec. 5, 1893.

Attest:
L. Lee.
Edward F. Kinsey

Inventor.
C. B. Wattles,
per Crane & Miller, attys.

(No Model.)  
5 Sheets—Sheet 3.

C. B. WATTLES.
GAS MOTOR ENGINE.

No. 509,981.  
Patented Dec. 5, 1893.

Attest:  
L. Lee.  
Edw. F. Kinsey

Inventor.  
C. B. Wattles,  
per Crane & Miller, Attys.

(No Model.) 5 Sheets—Sheet 4.

C. B. WATTLES.
GAS MOTOR ENGINE.

No. 509,981. Patented Dec. 5, 1893.

Attest:
L. Lee,
Edw. F. Kinsey.

Inventor.
C. B. Wattles,
per Crane & Miller, Attys.

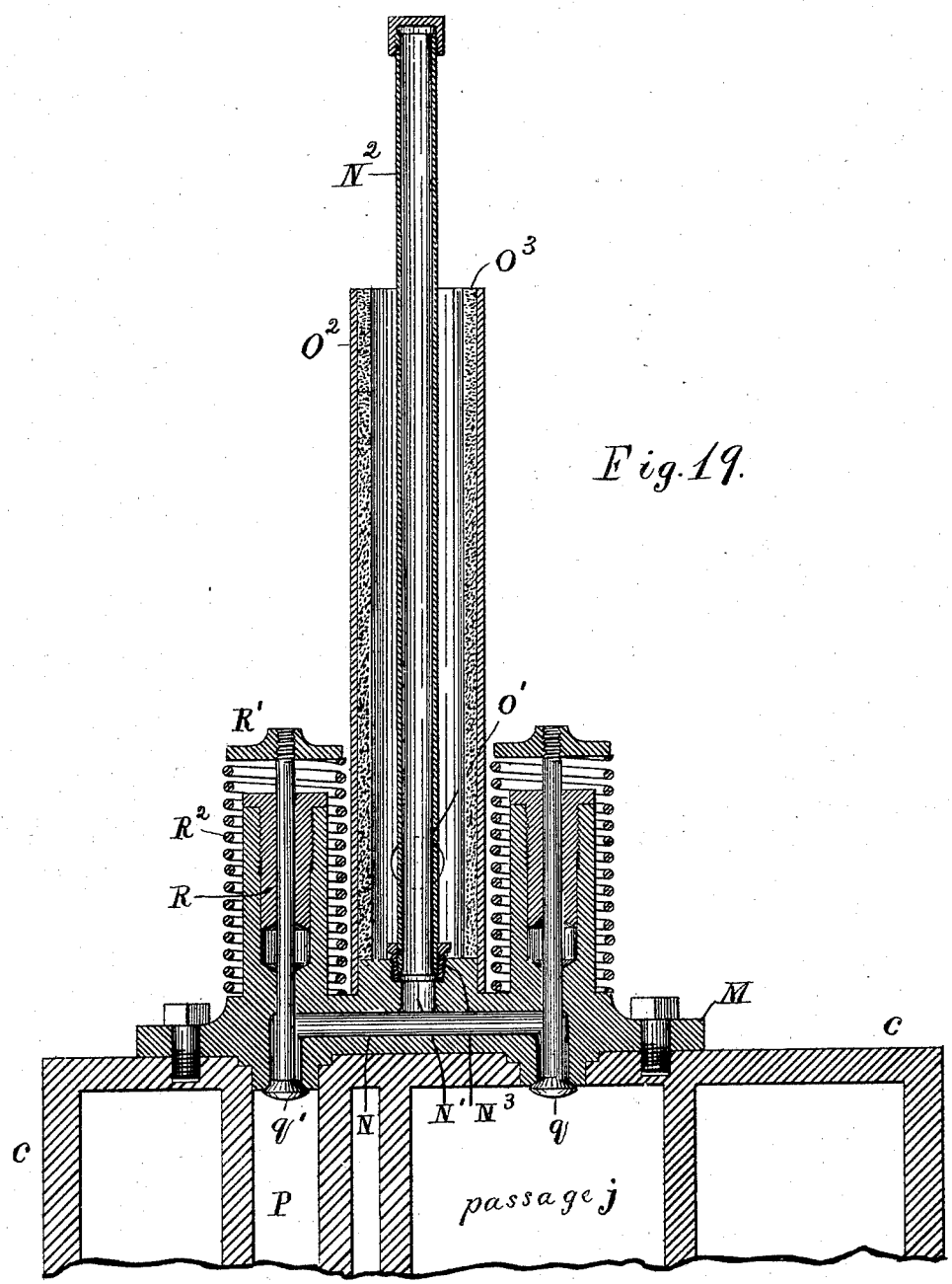

United States Patent Office.

CYRA B. WATTLES, OF ELIZABETH, NEW JERSEY.

GAS-MOTOR ENGINE.

SPECIFICATION forming part of Letters Patent No. 509,981, dated December 5, 1893.

Application filed September 21, 1891. Renewed December 8, 1892. Serial No. 454,492. (No model.)

*To all whom it may concern:*

Be it known that I, CYRA B. WATTLES, a citizen of the United States, residing at Elizabeth, Union county, New Jersey, have invented certain new and useful Improvements in Gas-Motor Engines, fully described and represented in the following specification and the accompanying drawings, forming a part of the same.

This invention relates to a gas motor engine in which an explosion is produced to propel the crank shaft at each rotation of the latter, and this class of gas engines has commonly been constructed heretofore with two separate cylinders, and separate pistons fitted to such cylinders and connected to separate cranks upon the same crank shaft so as to operate alternately.

The object of my present improvement is chiefly to simplify the construction of engines of this class and to reduce the cost of their manufacture, and it relates specially to engines comprising an annular cylinder, a circular cylinder of smaller diameter arranged concentric therewith, and two pistons fitted to the said cylinders.

The invention consists primarily in the combination, with a stationary portion formed with two of such members, of a reciprocating portion formed with the other two of the said members adapted to co-operate therewith, means for independently supplying both cylinders with charges of the explosive mixture, and independent exhaust valves for the cylinders.

I secure what I consider the most desirable form of the invention by arranging within a cylinder of given diameter a stationary piston having a cross section one half that of the cylinder, and fitting a trunk cylinder to move upon such stationary piston, carrying an annular piston fitted to the annular space around the stationary piston. The trunk cylinder with the annular piston forms a combined cylinder and piston which is connected to the crank shaft of the motor by a single connecting rod. Explosions of gas are produced alternately within the trunk cylinder and in the annular space around the stationary piston, and as such explosions operate upon either one end or the other of the trunk cylinder, both of the explosions impart an impulse to the same connecting rod, and thus to the crank shaft, at each rotation of the same.

In my construction, the trunk itself is inverted and is used as a cylinder, its bore being fitted to a stationary piston, and such construction furnishes special facilities for cooling the heated surfaces, as water may be circulated through such stationary piston, as well as through a water jacket around the movable piston.

The improvements consist partly in the construction and arrangement of both cylinders and pistons in two relatively-movable members, combined with a special arrangement of the supply and exhaust valves, partly in the employment of a single ignitor for both of the said cylinders, partly in a construction for furnishing access to the pistons, partly, in a construction for cooling the cylinders, partly, in the construction of the gas, air and exhaust valves and the gearing for actuating the same, and partly, in the governor mechanism for regulating the admission of the gas.

These improvements will be understood by reference to the annexed drawings, in which—

Figure 4:
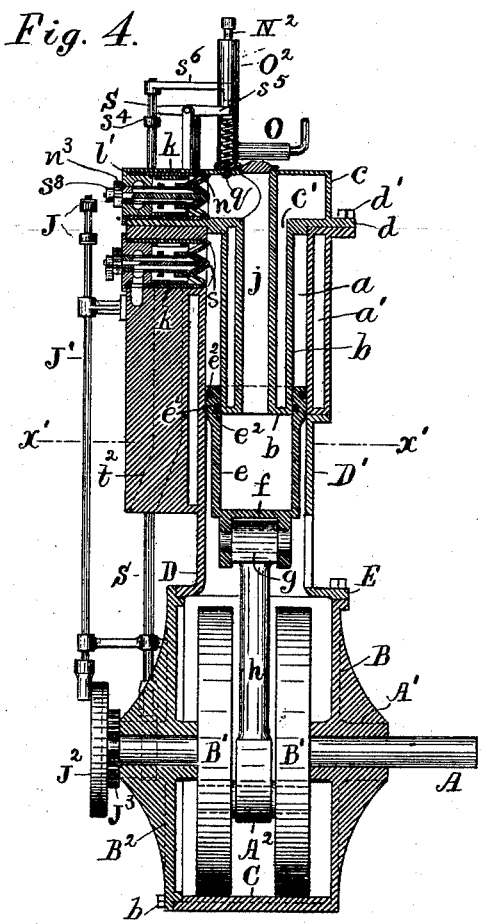
Figure 2:
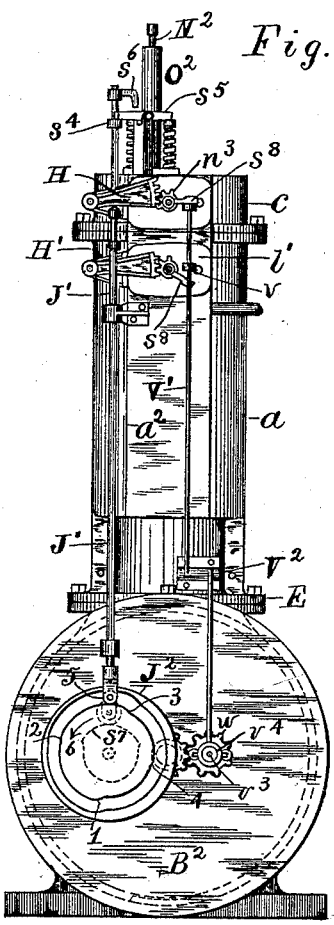
Figure 5:
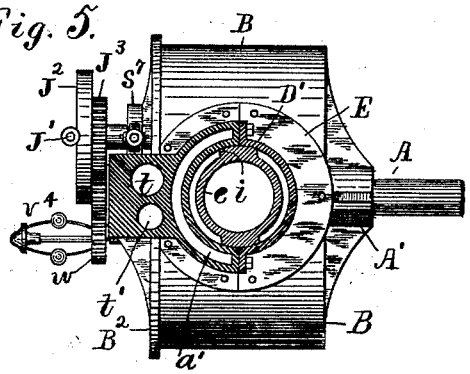
Figure 3:
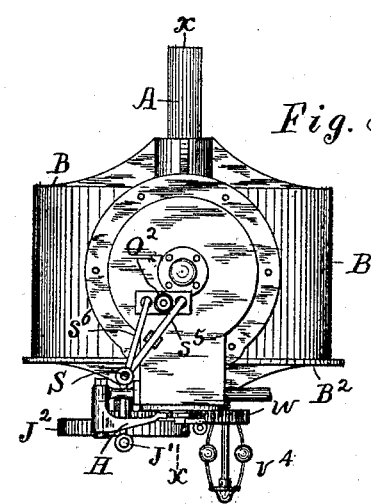
Figure 6:
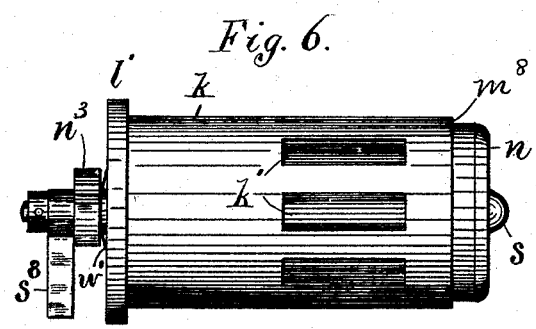
Figure 7:
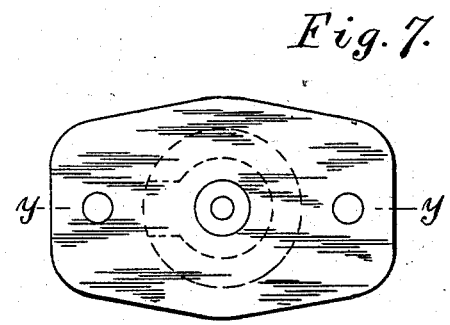
Figure 8:
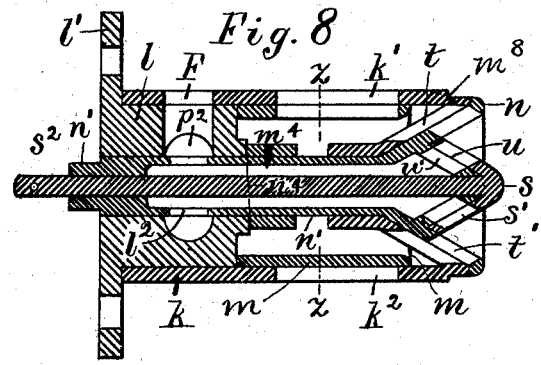
Figures 9, 10:
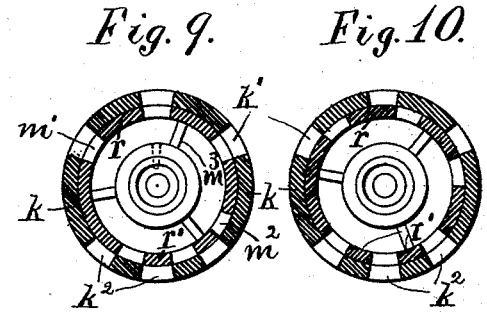
Figure 13:
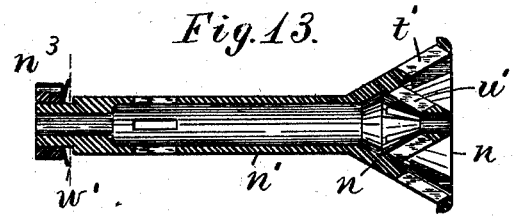
Figures 11, 14:
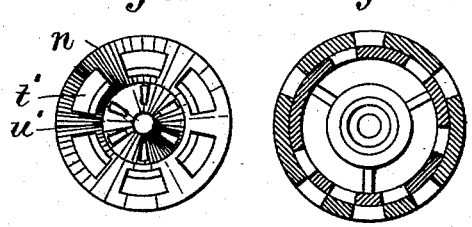
Figure 15:
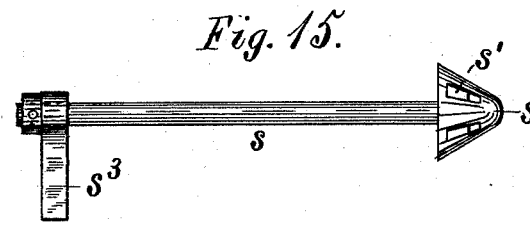
Figures 12, 16:
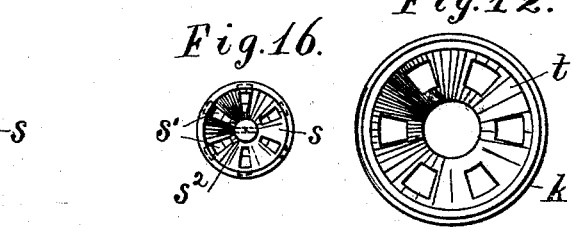
Figure 17:
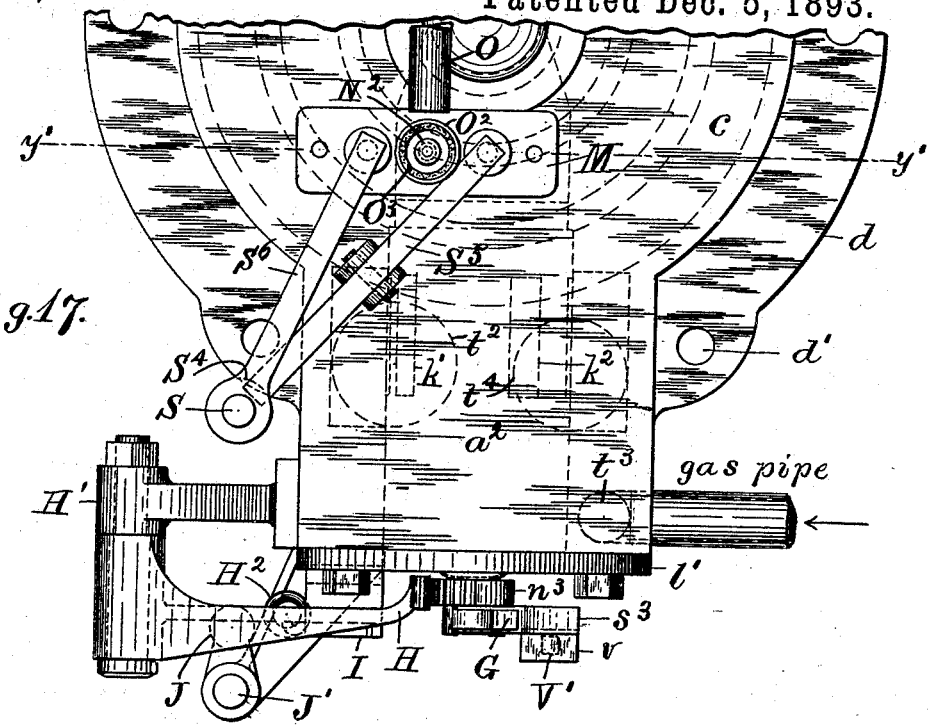
Figure 18:
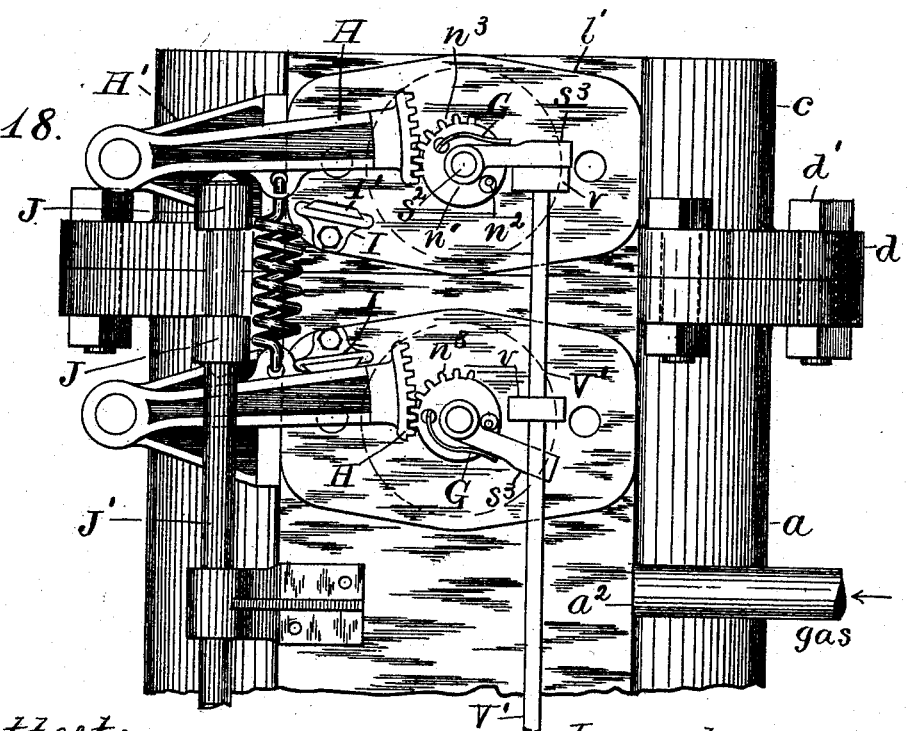

Figure 1 is an elevation of the motor at one edge of the casing with the ignitor removed. Fig. 2 is a rear elevation of the motor. Fig. 3 is a plan of the same. Fig. 4 is a vertical section on line $x$, $x$, in Fig. 3, with the parts in section where hatched. Fig. 5 is a transverse section on line $x'$, $x'$, in Fig. 4. Figs. 2 to 5 inclusive, are half the scale of Fig. 1. Fig. 6 is an elevation of one of the valve casings and valves removed from the valve chest with the attachments to the valve stem and spindle. Fig. 7 is an end view with the attachments removed. Fig. 8 is a longitudinal section on line $y$, $y$, in Fig. 7. Fig. 9 is a transverse section on line $z$, $z$, in Fig. 8, with the exhaust ports closed. Fig. 10 is a similar section with the exhaust passage opened and air ports closed, by a movement of the exhaust valve twenty degrees. Fig. 11 is a similar section with the exhaust passages again closed and the air ports still closed, by a movement of the exhaust valve forty degrees. Fig. 12 shows the inner end of the valve casing with the seat for cut off valve. Fig. 13 is a longitudinal section of the cut off valve and its attachment. Fig. 14 shows the inner end of the same. Fig. 15 is an elevation of the gas valve and its attachment; Fig. 16 an end view of the same. Fig. 17 is a plan of the valve gearing with part of the cylinder and valve chest. Fig. 18 is an elevation of the same parts. Figs. 6 to 15 inclusive, are upon a larger scale than the previous figures. Fig. 19 is a vertical section of the igniting apparatus upon a still larger scale, with part of head $c$ in section on line $y'$, $y'$, in Fig. 17.

A is the crank shaft of the motor mounted in bearings A' in opposite sides of the casing B, $B^2$. The shaft is divided within the casing and its ends provided with crank wheels B', united by a crank pin $A^2$. The wheels are made truly circular, and a seat C is formed in the bottom of the casing a very slight distance from the rims of the wheels so that the wheels may clear the same when rotating. The casing is formed with loose circular head $B^2$ upon one side, fitted to a circular opening and secured thereon by bolts $b$. By such construction, the crank wheels, connected with the pin $A^2$ and the two parts of the shaft A, may be supported upon the seat C while it is slid into place laterally within the casing, and the projecting end of the shaft be sustained very close to its proper level until the heads B and $B^2$ carrying the shaft bearings are applied to the casing and secured thereto, thus raising the crank wheels from contact with the seat C.

The letter $a$ designates the external cylinder of the engine, and thus applies to the annular space immediately within the same. A stationary piston $b$, whose cross section is one half that of the cylinder $a$, is sustained within the same by a head $c$ having flange $d$ secured by bolts $d'$ to a similar flange upon the cylinder. The cylinder is connected to the casing B by a cylinder extension D which is bored of the same diameter as the cylinder $a$, and is secured upon the casing by flange E. One half of the extension is made in a removable piece D', which is secured in place before the extension and cylinder are bored. A trunk cylinder $e$ is fitted to the piston $b$, and is provided at its outer end with closed head $f$ having pivot $g$ jointed to the connecting rod $h$. An annular piston $e'$ is formed upon the inner end of the trunk cylinder, and packings $e^2$ are applied at its outer and inner sides, where in contact with the cylinder $a$ and piston $b$. The parts $e$, $e'$ and $f$ form a combined cylinder and piston pivoted to the single connecting rod $h$, and fitted respectively to the inner piston $b$ and cylinder $a$. The trunk cylinder is shown in Fig. 4 near the lower end of the stroke, in readiness to compress a charge of explosive gas within the trunk cylinder, and the valve gearing in Figs. 2 and 4 is shown on the point of closing the valves of trunk cylinder $e$, preparatory to compressing the explosive mixture in the same, and opening the exhaust of annular cylinder $a$. The trunk cylinder is made smaller than the extension D', to avoid the conduction of heat unnecessarily thereto, by means of an air space between the parts, and is furnished, upon opposite sides of the pin $g$, with seats $i$ adapted to fit the extension, and thus guide the trunk cylinder in its movements. A water jacket $a'$ is provided outside the cylinder $a$, and water is circulated therein to cool the cylinder. The stationary piston $b$ is cooled by a similar circulation of water within an annular water space $c'$ which communicates with the interior of the head $c$, a passage $j$ being formed through the length of the piston to communicate with a valve chamber $k$. An ignitor valve $q$ opens into the passage $j$, and a similar valve $q'$ opens through the head $c$, by a passage $p$, (which is shown in Fig. 19) into the top of the annular cylinder $a$. The length of the annular space within the cylinder $a$ is greater than the stroke of its piston $e'$, so as to regulate the compression of the explosive gas in the desired degree, and a similar regulation is effected for the trunk cylinder, without similarly increasing its length, by forming the passage $j$ of suitable dimensions.

A valve chest $a^2$ is formed at the side of the cylinder $a$ over the outer end of the shaft A, and a valve casing $k$ is inserted through the same to the annular space $a$, a similar casing being inserted in the head $c$. The casings are constructed alike, and contain each an exhaust valve $m$, a cut off valve $n$, and a gas valve $s$. The casings are formed with cylindrical bore, with a plug $l$ fitted in the outer end, having flange $l'$ to secure it upon a chest. Air ports $k'$, about twenty degrees in width, are formed in one side of the casing, and exhaust ports $k^2$ of the same width in the opposite side. The exhaust valve $m$ is furnished upon one side with ports $m'$ which are fitted to the air ports $k'$, and separated by covers $r$ about forty degrees in width. The opposite side of the valve $m$ is formed with exhaust ports $m^2$ fitted to the ports $k^2$, with intermediate covers $r'$ of the same width as the ports. The inner end of the casing is furnished with a hollow conical seat $t$ having six ports equally separated and about twenty degrees in width. The cut-off valve $n$ with ports $t'$, is fitted to such conical seat and provided with hollow stem $n'$ to which the exhaust valve is rigidly secured by hub $m^4$ and arms $m^3$. A sloping face $n^4$ is formed on plug $l$, in contact with a similar face on the hub $m^4$, and operates, at each opening movement of the cut off valve, to lift the same slightly from the seat $t$, to prevent the cutting or grinding of the surfaces. The sloping face permits the valve to rest firmly upon its seat during the explosion. An annular space $p^2$, connected with a gas supply by lateral aperture F, communicates with the interior of the stem by openings $l^2$, and the gas flows thence to a projecting conical seat $u$ formed upon the center of the cut-off valve, with six equally separated gas ports $u'$ about fifteen degrees in width. The gas valve $s$ is fitted to the exterior of the conical seat $u$, and provided with six ports $s'$ about twenty degrees in width, arranged to agree with the ports $u'$. The spindle of the valve $s$ passes through the hollow stem $n'$ and projects outside the same to receive a tappet arm $s^3$ which forms the attachment by which it is actuated. The hollow stem is provided with a cogged segment $n^3$ upon its outer end, which forms the attachment for actuating the cut-off valve. The segment is provided with a spring G for pressing the tappet arm $s^3$ normally toward a pin $n^2$ upon the segment, and such spring causes the tappet arm to rotate with the segment until arrested. Stops $v$ are attached to the upper end of a lever arm V′ which is pivoted upon the engine casing or frame in a bearing V², the opposite end of the lever being vibrated by a rod $v^3$ attached to the moving head of a governor $v^4$. The connection of the lever with the governor rod is fully shown in Fig. 1, the governor being mounted upon the casing B² adjacent to the shaft A, and connected therewith by gear wheels $w$.

The governor holds the lever V′ with the stops $v$ normally in the path of the tappet arms $s^3$, so as to arrest the same when the stem $n'$ is rotated twenty degrees. A further rotation of the stem, while the gas valve is held stationary, operates to open the ports $u'$, and discharge the gas as desired. The stems $n'$ are operated alternately by toothed sectors H pivoted upon bearings H′ upon the valve chest, the sectors being drawn normally toward one another by a spring H² and arrested at the inward limit of their movement, by stops I lined with elastic packing I′. The sectors are pushed outwardly from the stops alternately, by dogs J attached to a cam rod J′, which is actuated by a grooved cam J² pivoted upon the casing B² adjacent to the crank shaft, and rotated at one half the speed of the crank shaft by gears J³. The cam is provided with two rising steps, marked 1 and 2, and with two falling steps, of unequal height, marked 3 and 4, which operate successively to shift the stems $n'$ twenty degrees alternately twice in a forward direction and twice in a backward direction. The cam is concentric between the several steps and revolves in the direction shown by the arrow 6 in Fig. 2, and the roll 5 attached to the cam rod J′ is shown adjacent to the step 3 with the upper sector H wholly shifted (as shown in Fig. 18) and the upper stem $n'$ rotated about forty degrees. The upper tappet arm is shown in contact with the stop $v$, and the lower tappet arm moved away from the same twenty degrees. The toothed segment $n^3$ upon the upper stem is shown with the pin $n^2$ turned twenty degrees from the tappet arm, which indicates that the seat $u$ is turned beneath the gas valve so as to fully open the ports in the same. Fig. 9 shows the air ports opened by this movement. A mixture of air and gas would thus flow into the cylinder until the step 3 in the cam passes the roller 5, when the stem would be turned backward forty degrees, bringing the pin $n^2$ into contact with the still stationary arm $s^3$, and closing the cut-off valve, as shown in Fig. 11. The cam holds the valve stationary between the action of the several steps. It will be noticed by reference to the upper sector in Fig. 18 that the cam rod J′ is moved a sufficient distance to fully actuate the sector H after the dog J is shifted from the other sector. In like manner the rod is moved a sufficient space to move each sector through its full stroke and thus turn the valve $m$ forty degrees after the dog has been withdrawn from the other sector; but the steps 2 and 4 are made of less height, so as to actuate the sector only half that distance. By this construction the passage of the step 3 over the roll 5 turns the upper exhaust valve into the position shown in Fig. 11 with both the cut off and exhaust valves closed. The upper sector H is then in contact with the stop I′, and the gas valve is closed by the action of the spring G; the upper sector and segment $n^3$ taking the position shown in the drawings for the lower segment and sector. During the movement of the step 4 toward the cam roll, the air and gas valves connected with the annular cylinder $a$ remains closed and the cut off valve open, and the annular piston is making its upward stroke, and expelling the consumed gases from space $a$. The movement of the step 4 over the roll does not affect the position of the upper valves, but shifts the cam roll, to turn the lower exhaust valve into the position shown in Fig. 9, at the commencement of its forward or downward stroke; the cut-off valve remaining open, so that the annular piston $e'$ may draw in air and gas. The passage of the step 1 over the same roll moves the lower cut-off valve forty degrees and closes it, and shifts the upper exhaust valve twenty degrees, into the position shown in Fig. 10, to exhaust the gases from the trunk cylinder upon the return stroke, the same stroke operating to compress the gases in the annular cylinder. At the turning of such upward stroke, the gases are ignited in the annular cylinder, driving the piston forward again; the step 2 operating, when the explosion is created in the annular cylinder, to shift the upper exhaust valve into the position shown in Fig. 9, to draw air and gas into the trunk cylinder during the forward stroke of the same.

It is obvious that in an engine provided with two alternately operating pistons, the cam just described would produce the same movements of the valves and thus the same movements of the pistons, whatever the nature of the valves.

In Fig. 6 a dished spring $w'$ is shown between the segment $n^3$ and flange $l'$ to hold the cut off valve upon its seat, the spring being also shown in Fig. 13 with a dotted line $l'$ representing the same flange. A cycle of cam movements, which is thus performed in two rotations of the crank shaft A, actuates the valves in both the valve casings $k$, so as to admit gas and air alternately to the trunk cylinder and the annular cylinder, to wholly close the valves during the compression of the same, and to open the valves for exhausting the products of combustion. An impulse is thus given to the trunk cylinder at each revolution of the crank shaft, and the power transmitted to such shaft by the connecting rod is twice as great as in other gas engines giving the same intensity of impulse; and the motion imparted to the crank shaft is much more uniform than in gas engines heretofore devised having the same aggregate piston area. The area of the stationary piston $b$ is one half that of the entire cylinder $a$, so that the annular piston $e'$ furnishes the same area for effective pressure as the head $f$ upon the trunk cylinder, and the explosion impulses alternately imparted to the connecting rod are therefore equal. The power of the machine is thus doubled with very slight increase in its dimensions, such increase being almost wholly in the cylinder and its attachments; which, in any case, would not equal the bulk of the crank plates and their bearings. The power of the engine is thus greatly increased without materially altering the floor space it occupies. The air and gas may be introduced to their respective valves in any convenient manner, the drawings showing vertical passages cast in the chest $a^2$ for such purpose; the exhaust passage $t^2$ intersecting one side of each valve casing $k$, and the air passage $t^4$ intersecting the opposite side as shown in Fig. 17. The valve casings are thus supplied with air through the ports $k^2$. The gas passage $t^3$ extends in a similar manner past each of the casings, and is connected with the aperture F leading to the space $p^2$.

The air passage is connected at its lower end with the interior of the casing B through the side of the cylinder extension D', and the noise caused by the suction of the air is thus greatly deadened. The exhaust passage would be connected with a chimney as usual. Where the power of the engine, with an explosion impulse at each rotation, is greater than the load imposed upon the shaft A, the velocity of the shaft increases slightly, and the governor rod then moves the upper end of the lever arm V' outward sufficiently for the stop $v$ to clear the ends of the tappet arms. The gas valve then turns with the air valve, and the ports $u'$, through which the gas would be admitted to the cylinder, remain closed; and the engine continues to rotate without receiving any explosive mixture until the speed falls to the normal point. The crank wheels B' are in practice made heavy enough to store up the explosive impulse, and the engine may therefore be run, to generate a low power, with one fourth or even one eighth of the full number of explosions; the governor operating automatically to open the gas valve at regular intervals when the speed of the crank shaft is reduced below the normal point.

The ignitor may be made of any convenient form to fire the explosive mixture in the cylinders; the form shown herein consisting in a removable heated tube, the interior of which is connected by a single passage with two ignitor valves. These valves communicate respectively with the trunk cylinder and the annular cylinder, and are alternately opened at each rotation of the crank shaft, so that the mixture in either of such cylinders may penetrate to the red hot tube and thus be fired at the beginning of the stroke. The ignitor attachment is shown in Fig. 19 formed in one casting, with base M bolted upon the top of the head $c$. A passage N, in the base, communicates at its middle with an opening N', into the outer side of which the heated pipe $N^2$ is secured, by bushing $N^3$. The outer end of the tube $N^2$ is capped, and it is surrounded by a chimney $O^2$ lined with asbestus $O^3$ both of which are perforated with aperture O' through which a highly heated jet is projected by a Bunsen burner O of any suitable construction.

Only the nozzle of the burner O is shown in Fig. 17, as such burners are well known in the arts. Ignitor valves $q$ and $q'$ are applied to the opposite ends of the passage N and have spindles projected upward through stuffing boxes R and furnished at the outer ends with caps R' beneath which springs $R^2$ are inserted to hold the valves normally closed. The two valves, as shown in Fig. 1, open respectively into the passage $j$ and into an adjacent passage P formed through the head $c$ to communicate with the annular space $a$.

The ignitor cam $s^7$ is fixed upon the same arbor with the gears $J^3$ and the valve cam $J^2$, and is thus rotated once for each double revolution of the crank shaft. The ignitor rod S, moved by the cam $s^7$, opens the valves $q, q'$, alternately; one of the valves being moved directly by arm $S^6$ upon the downward movement of the rod, and the other one indirectly upon the upward movement of the rod by a lever $S^5$, one end of which presses upon the valve as the other end is moved upward by a collar $S^4$ upon the rod.

From the above description it will be seen that the mechanism for actuating the valve gearing and the ignitor is moved by the two cams $s^7$ and $J^2$, which are rotated together at the same speed by the gears $J^3$. The arrangement of the parts renders the air, gas, and ignitor valves accessible and removable, so that the parts may be readily repaired when damaged or worn.

In Fig. 6 a small shoulder $m^8$ is shown at the inner end of the valve casing, which is ground to a suitable seat in the valve chest $a^2$, and the valve casing is thus rendered tight when in its place, while it is conveniently removable from the valve chest by detaching the bolts which hold the flange $l'$, and the entire fixtures belonging to one valve casing can thus be replaced by another set, with very trifling delay. The gas motor is represented, in the drawings, of upright type, but it is obvious that all the mechanical parts would operate with the same efficiency if the cylinders were supported in a horizontal position, and it is therefore immaterial how the parts be placed, provided they operate in the same relation.

The gas and air valves are described as moved through two arcs of twenty degrees each, and such movement is attained by making several air and gas ports in the cylindrical valve casing, and each port about twenty degrees in width with an interspace of twenty degrees; but it is obvious that other proportions may be used for the passages and for the movements of the valves, by changing the number and size of the ports. It will be observed that the valve $m$ which is applied to the air and gas ports $k, k'$, is of cylindrical character and cannot therefore be ground to its seat; but this valve is only intended to prevent the drawing of foul air from the exhaust passages into the cylinder, and is not intended to form a close joint with the casing, as the valve $n$ which is fitted air tight to its seat seems to wholly cut off the connection of the cylinder in which the explosion occurs from the ports $k, k'$.

Having thus set forth the nature of the invention, what I claim is—

1. In a gas motor engine comprising an annular cylinder, a circular cylinder of smaller diameter arranged concentric therewith and two pistons fitted to the said cylinders, the combination, with a stationary portion formed with two of such members, of a reciprocating portion formed with the other two of the said members adapted to cooperate therewith, means for independently supplying both cylinders with charges of the explosive mixture, and independent exhaust valves for the cylinders.

2. In a gas motor engine, the combination, with an annular cylinder having a stationary cylindrical piston in the center, of a trunk cylinder movable upon such piston and carrying an annular piston fitted to the annular cylinder, means for independently supplying both cylinders with charges of the explosive mixture, and independent exhaust valves for the cylinders, as and for the purpose set forth.

3. In a gas motor engine, the combination, with an annular cylinder having a stationary cylindrical piston in the center, of a trunk cylinder movable upon such piston and carrying an annular piston fitted to the annular cylinder, means for independently supplying both cylinders with charges of the explosive mixture, independent exhaust valves for the cylinders, and means for circulating water upon the inner and outer sides of the annular cylinder, as and for the purpose set forth.

4. In a gas motor engine, the combination, with an annular cylinder having a stationary cylindrical piston in the center, of a trunk-cylinder movable upon such piston and carrying an annular piston fitted to the annular cylinder, means for independently supplying the cylinders with charges of the explosive mixture, means for exhausting the cylinders independently of each other, a single ignitor for the explosive mixtures in both cylinders, and valved channels connecting the ignitor with both cylinders, substantially as set forth.

5. In a gas motor engine, the combination, with an annular cylinder having a stationary cylindrical piston in the center, of a trunk-cylinder movable upon said piston and carrying an annular piston fitted to the annular cylinder, means for independently supplying both cylinders with charges of the explosive mixture, means for exhausting the cylinders independently of each other, a single ignitor for the explosive mixtures in both cylinders, channels connecting the ignitor with the annular cylinder and trunk-cylinder, valves in said channels and means for alternately operating said valves so as to produce separate alternating explosions in each cylinder, substantially as set forth.

6. In a gas motor engine, the combination, with the valve chest $a^2$ having the valve casing $k$ seated in one side, of the stationary piston $b$ having the head $c$ for sustaining it within the cylinder $a$, and provided in one side with the second valve casing $k$, as set forth.

7. In a gas motor engine, the combination, with the cylinder $a$ having the cylinder extension $D'$ bored of the same diameter, and the crank wheel casing sustaining the same, of the stationary piston $b$ having the head $c$ for sustaining it within the cylinder $a$, the valve casings $k$ arranged one above the other with gas, cut off and exhaust valves therein, the cam $J^2$ driven at one half the speed of the crank shaft, the cam-rod $J'$ actuated thereby, and connections from the cam-rod to the gas and air valves to actuate the same alternately, as set forth.

8. In a gas motor engine, the combination, with the cylinder $a$, of the stationary piston secured therein with passage $j$ through the same to an ignitor valve, the trunk cylinder with annular piston attached, the ignitor tube, the ignitor valves $q$ and $q'$ connected respectively with the annular and trunk cylinders, the cam $s^7$ rotated at one half the speed of the crank shaft, and the ignitor-rod with means for opening the ignitor valves alternately, as set forth.

9. In a gas motor engine, the combination with the casing B having head $B^2$, and the cylinder $a$ and piston $b$ sustained upon the same with trunk cylinder and connected to the motor shaft A, the valve gearing attached to the side of the cylinder, two ignitor valves upon the top of the cylinder, the cams $s^7$ and $J^2$ mounted together upon the cover $B^2$ and rotated at one half the speed of the motor shaft, and the cam rod J' and ignitor rod S connected with the valve gearing and ignitor valve, as set forth.

10. In a gas motor engine, the combination, with a cylindrical valve casing $k$ having conical seat at the end, of a cut off valve fitted to such seat and having a hollow stem, a gas connection to such stem, and a gas valve seated upon the cut off valve, with ports leading inside the hollow stem, and spindle passed through such stem, as set forth.

11. In a gas motor engine, the combination, with a cylindrical valve casing having conical seat at the end, of a cut off valve fitted to such seat with hollow stem projected outside the head of the valve chamber, a gas connection to such stem, a gas valve seated upon the cut off valve with ports leading inside the hollow stem, and spindle projected through the hollow stem, a tappet arm upon such spindle, and a spring attached to the hollow stem for pressing the tappet arm against a pin or stop movable with the stem, as set forth.

12. In a gas motor engine, the combination, with a cylindrical valve casing having a cut off valve seated upon the end, with a hollow stem projected outward through the head of the chamber, of a gas valve seated upon the cut off valve with ports leading inside the hollow stem, a gas connection to such stem, air and exhaust passages formed through the walls of the valve casing, and cylindrical exhaust valve attached to the hollow stem for opening and closing such passages, as set forth.

13. In a gas motor engine, the combination, with a cut off valve having a hollow stem, of a gas valve having spindle projected through such stem, and supplied with gas through the same, the tappet arm $s^3$ upon the spindle, the spring G and pin $n^2$ movable with the hollow stem, means for rotating the cut off valve, and stops $v$ movable by a governor in the path of the tappet arms, as set forth.

14. In a gas motor engine, the combination, with a cylindrical valve casing having passages formed through the walls of the same for air and exhaust, of a cut off valve seated upon the end of the casing with the head projecting through the head of the same, a gas valve seated upon the cut off valve with spindle projected through the hollow stem, and supplied with gas through the same, the tappet arm $s^3$ upon the spindle, the spring G and pin $N^2$ movable with the hollow stem, means for rotating the cut-off valve, and stops movable by a governor in the path of the tappet arms, as set forth.

15. In a gas motor engine, the combination, with the rotary cut-off valves and stems provided with the toothed segments $n^3$, of the sectors H provided with stops I and pressed normally toward the stops by a spring, and a cam shaft with dogs adapted to move the sectors alternately, as set forth.

16. In a gas motor engine, the combination, with the cut-off valves and stems having the segments $n^3$ attached thereto, of gas valves seated upon the cut-off valves with spindles projected outside of the segments and provided with tappets $s^3$, the springs G and pins $n^2$ movable with the segments, the governor stops $v$ actuated as described, the sectors H with stops I and spring $H^2$ and the cam shaft J' with dogs J for moving the sectors alternately, substantially as set forth.

17. In a gas motor engine, the combination, with the circular crank wheels B' and their casing B $B^2$, of the crank bearings A', and the seat C, in the bottom of the casing, as and for the purpose set forth.

18. In a gas motor engine, the combination, with the motor cylinder and a valve chest upon the same, of the cylindrical valve casing $k$ having one or more valves rotary within the same, and provided with a shoulder $m^8$ fitted to a seat in the valve chest, and the flange $l'$ and bolts to hold the valve casing removably upon the seat, as and for the purpose set forth.

19. In a gas motor engine, the combination, with a cylindrical valve casing having conical seat upon the end, and the plug $l$ fitted within the other end, of a cut-off valve fitted to such seat with stem extended through the plug, the hub $m^4$ upon the valve stem and the sloping face $n^4$ formed upon the plug $l$ in contact with such hub, as and for the purpose set forth.

In testimony whereof I have hereunto set my hand in the presence of two subscribing witnesses.

CYRA B. WATTLES.

Witnesses:
FOSTER M. VOORHEES,
HENRY J. MILLER.